United States Patent
Song

(10) Patent No.: US 8,703,234 B2
(45) Date of Patent: Apr. 22, 2014

(54) COLD SPRAYED AND HEAT TREATED COATING FOR MAGNESIUM

(75) Inventor: Guangling Song, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 209 days.

(21) Appl. No.: 13/191,771

(22) Filed: Jul. 27, 2011

(65) Prior Publication Data

US 2013/0029177 A1 Jan. 31, 2013

(51) Int. Cl.
*B05D 1/12* (2006.01)
*B05D 3/02* (2006.01)

(52) U.S. Cl.
USPC ........... 427/192; 427/191; 427/201; 427/205; 427/427

(58) Field of Classification Search
USPC ................ 427/191, 192, 201, 205, 427
See application file for complete search history.

(56) References Cited

U.S. PATENT DOCUMENTS

| | | | |
|---|---|---|---|
| 7,455,881 B2 * | 11/2008 | Raybould et al. | 427/203 |
| 7,927,468 B2 | 4/2011 | Song et al. | |
| 8,052,224 B2 | 11/2011 | Luo et al. | |
| 8,181,690 B2 | 5/2012 | Song et al. | |
| 8,187,439 B2 | 5/2012 | Wang et al. | |
| 8,187,440 B2 | 5/2012 | Song | |
| 8,192,801 B2 | 6/2012 | Song et al. | |
| 2002/0168466 A1 * | 11/2002 | Tapphorn et al. | 427/180 |
| 2011/0064941 A1 | 3/2011 | Sachdev et al. | |

FOREIGN PATENT DOCUMENTS

| | | |
|---|---|---|
| AT | 413034 B | 10/2005 |
| CN | 102899658 | 1/2013 |
| DE | 102005063324 B4 | 2/2008 |
| DE | 102009018685 A1 | 10/2010 |
| DE | 102012212954 | 1/2013 |
| EP | 1790752 A1 | 5/2007 |
| EP | 1995344 A1 | 11/2008 |
| WO | 2006/013184 A1 | 2/2006 |

OTHER PUBLICATIONS

ASTM International Designation B117-07, Standard Practice for Operating Salty Spray (Fog) Apparatus, pp. 1-10 (Rev. Mar. 1, 2007).
Spencer, K., et al., "Heat treatment of cold spray coatings to form protective intermetallic layers," Scripta Materialia, vol. 61, pp. 44-47 (2009) (published online Mar. 10, 2009).
Liqun Zhu and Guangling Song, "Improved corrosion resistance of AZ91D magnesium alloy by an aluminium-alloyed coating", Science Direct, Surface & Coatings Technology 200 (2006) 2834-2840.
Y. Tao, T Xiong, C. Sun, L. Kong, X. Cui, T. Li, and G. Song, "Microstructure and corrosion performance of a cold sprayed aluminium coating on AZ91D magnesium alloy", Corrosion Science 52 (2010) 3191-3197.
"Low Melting Point Metals", Buehler website, retrieved Jun. 2011, <http://www.buehler.com/technical_information/Buehler%20Book/low_melting_point_metals.pdf>.

* cited by examiner

*Primary Examiner* — Frederick Parker
(74) *Attorney, Agent, or Firm* — Harness, Dickey & Pierce, P.L.C.

(57) ABSTRACT

Methods of coating a magnesium substrate are provided along with coated magnesium substrates. A low melting point material is cold sprayed onto a region of the magnesium substrate. A corrosion resistant material or a zinc material is cold sprayed over at least a portion of the low melting point material to form a coated magnesium substrate. The coated magnesium substrate is then heated.

17 Claims, 2 Drawing Sheets

COLD SPRAYED AND HEAT TREATED COATING FOR MAGNESIUM

FIELD

Figure 1:
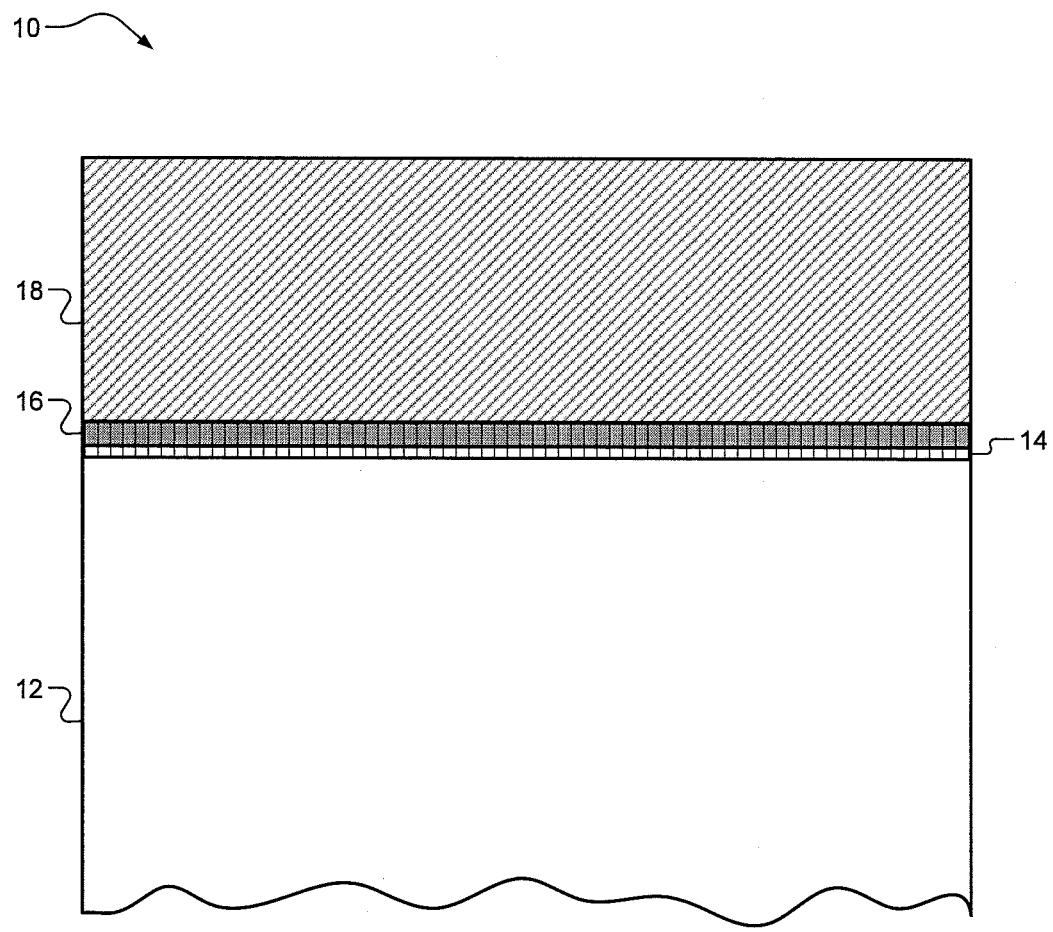

The present disclosure relates to methods of coating magnesium, and more particularly to methods of cold spraying and heat treating magnesium.

BACKGROUND

This section provides background information related to the present disclosure which is not necessarily prior art.

Magnesium and magnesium alloys have the low density, high strength-to-weight ratio, and high stiffness that make them increasingly useful in various applications such as those for automotive and electronic industries. However, the implementation of magnesium and magnesium alloys into various industries is limited because the materials are highly susceptible to corrosion.

Protective coatings have been used to prevent corrosion, but options for applying protective coatings have shortcomings that deter using magnesium and magnesium alloys. For example, various coating techniques have been asserted such as cold spraying and hot diffusion. Cold spraying includes spraying particles on a substrate at a temperature below the melting temperature of the particles. The kinetic energy of the cold sprayed particles causes the particles to plastically deform on the substrate. Cold spraying techniques have limited success on magnesium alloys. Further, cold spraying techniques have the limitation of unwanted porosity of the sprayed layer because the layer is formed by an agglomeration of particles against the substrate.

Another coating technique, hot diffusion has also been used in which the substrate is submerged in a heated powder of the material to be coated onto the substrate. Hot diffusion provides good adhesion of the coating, but the microstructure of the applied protective coating is inconsistent leading to inconsistent coating and performance. Further, hot diffusion techniques require a processing temperature that is close to the melting point of the substrate to be coated. Should the heat from the hot diffusion be sufficient to warp or melt the substrate, the desired properties of the substrate may be undesirably modified or lost.

SUMMARY

This section provides a general summary of the disclosure, and is not a comprehensive disclosure of its full scope or all of its features.

In various aspects, the present teachings provide methods of coating a magnesium substrate. A low melting point material is cold sprayed onto a region of the magnesium substrate. A corrosion resistant material is cold sprayed over at least a portion of the low melting point material to form a coated magnesium substrate. The coated magnesium substrate is then heated.

In yet other aspects, methods of preparing a coated magnesium substrate are provided. A barrier layer is built including a plastically deformed low melting point material or barrier material on at least a region of the magnesium substrate. An overlayer is built including a plastically deformed corrosion resistant metal, for example, an aluminum or zinc material, over at least a region of the barrier layer to form the coated magnesium substrate. The coated magnesium substrate is heated to at least a melting temperature of at least one of the barrier material and the aluminum or zinc material.

In still other aspects, coated magnesium substrates are provided. The coated magnesium substrates include a magnesium substrate, a cold sprayed low melting point material on at least a portion of the magnesium substrate, and a cold sprayed protective material on at least a portion of the low melting point material.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 2A:
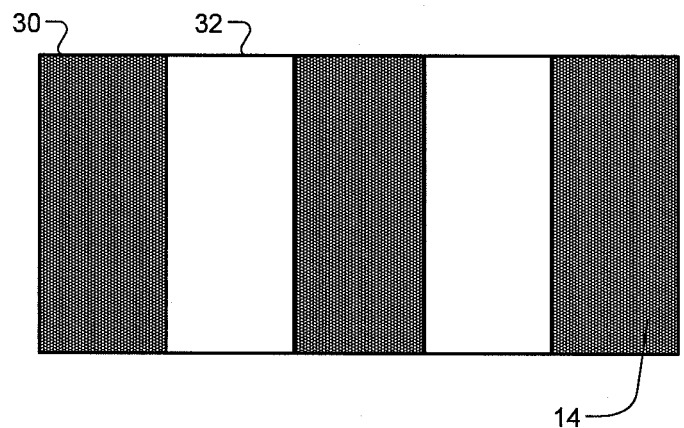
Figure 2B:
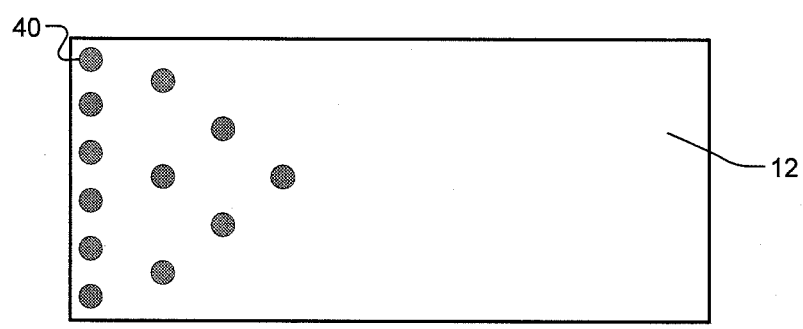
Figure 2C:
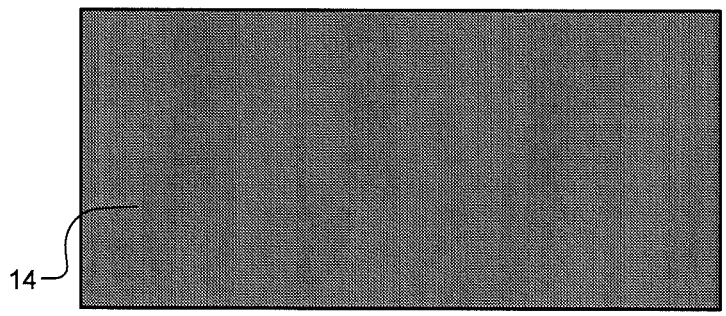

FIG. 1 depicts a partial view of a coated magnesium according to various aspects of the present teachings; and FIGS. 2A-2C depict varied applications of barrier materials according to various aspects of the present teachings.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising,""including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to,""connected to," or "coupled to" another element or layer, it may be directly on, engaged, connected or coupled to the other element or layer, or intervening elements or layers may be present. In contrast, when an element is referred to as being "directly on,""directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second,"and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below,""lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

"About" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates a possible variation of up to 5% of the indicated value of 5% variance from usual methods of measurement. For example, a component of about 10 wt. % could vary between 10±0.5 wt. %, thus ranging from between 9.5 and 10.5 wt. %.

Referring to FIG. 1, an exemplary coated magnesium 10 is provided. The coated magnesium 10 includes a magnesium or magnesium alloy substrate 12, a barrier layer 14, a transition region 16, and a overlayer 18. The barrier layer 14 and the overlayer 18 provide the corrosion resistant properties to the magnesium. In various aspects, and as will be further detailed in the methods description, the cold spraying of the barrier layer 14 and the overlayer 18 provide a structure that is fundamentally different from coated magnesium materials prepared using other techniques. Notably, the dispersion of the materials that form the barrier layer 14 and the materials that form the overlayer 18 is enhanced as compared to other application techniques. Still further, the cold spraying allows the combined materials from the barrier layer 14 and the overlayer 18 to be secured to the magnesium substrate 12 at a lower temperature. By implementing a low melting point material in the barrier layer 14, the subsequent heat treatment allows for dispersion of the materials forming the barrier layer 14 and the materials forming the overlayer 18 at a lower temperature. Particularly, the reduced application temperature for the overlayer 18, through incorporation of the intermediate barrier layer 14, prevents unwanted modification of the underlying magnesium substrate 12 that is sensitive to heat and oxidation. Further, the barrier layer 14 can melt with the surface of the substrate 12, forming good metallurgical adhesion with the substrate 12. It is also an additional means by which to protect the underlying magnesium substrate 12. The combined layers 14 and 18 provide better adherence, reduced porosity, and improved longevity and corrosion protection of the underlying substrate 12.

The magnesium substrate 12 is made of magnesium or a magnesium alloy. The magnesium substrate 12 is "magnesium-based" or in other words, the composition is primarily comprised of magnesium, generally greater than 80 weight percent of magnesium. As stated above, magnesium is beneficial due to its high strength and low weight. However, the sensitivity of magnesium to corrosion and heat frustratingly prevents the usage of magnesium. Methods and apparatus detailed herein address the peculiar concerns regarding magnesium and other corrosion susceptible materials.

As used herein, the term "composition" refers broadly to a substance containing at least the preferred metal elements or compounds, but which may also comprise additional substances or compounds, including additives and impurities. The term "material" also broadly refers to matter containing the preferred compounds or composition.

The magnesium substrate 12 has an appropriate dimensions for the desired application. For example, where the coated magnesium 10 is to be used as part of a hand held electronic device, the magnesium substrate 12 will generally have the thickness, height, and width required for that usage and size limitations of the particular device. In contrast, a larger magnesium substrate 12 would be used for a panel for a vehicle body or for a piece of large machinery. The coatings and methods detailed herein are suitable for application to magnesium substrates of different dimensions.

Immediately adjacent the substrate 12 is the barrier layer 14. The barrier layer 14 serves as a tie-layer to secure the overlayer 18 to the substrate 12. The materials used for the barrier layer 14 including low melting point materials. As used herein, low melting point materials have a melting point of from equal to or less than about 300 degrees Celsius, including all sub-ranges. In other aspects, the low melting point material has a melting point of from greater than or equal to about 50 degrees Celsius to less than or equal to about 200 degrees Celsius, including all sub-ranges. This melting point is generally less than the melting point of the overlayer material as will be detailed herein. Exemplary low melting point materials include antimony, bismuth, cadmium, lead, tin, and combinations or alloys thereof. The low melting point materials are provided in particulate or powder form to facilitate application by cold spraying.

The barrier layer 14 has a thickness of from about a monolayer up to a thickness of equal to or less than 1 millimeter, including all sub-ranges. The barrier layer 14 includes a low melting point material that has been plastically deformed on the magnesium substrate due to the force of application from cold spraying. The barrier layer 14 is not melted onto the magnesium substrate when it is first applied but is rather adhered using the kinetic force from the spraying application.

Turning to FIGS. 2A-2C, in select aspects, the barrier layer 14 is in a variety of discontinuous shapes or as a continuous element over the magnesium substrate 12. This discontinuous application of layer 14 is designed in case the low melting point material is not suitable for use on some areas of the substrate 12. As used herein "discontinuous" refers to the intentional provision of regions of differing thickness or width of the barrier material. This includes the barrier material being adjacent exposed magnesium. As shown in FIG. 2A, the barrier layer 14 is a series of discontinuous stripes 30. The stripes 30 are separated by bands 32 of exposed magnesium substrate 12. While the stripes 30 are depicted as being generally uniformly sized and evenly spaced apart, it is understood that the stripes 30 may be of different widths and/or that they may be unevenly spaced apart.

Turning to FIG. 2B, the barrier layer 14 includes a series dots 40 that are applied in a discontinuous and unevenly spaced pattern over the magnesium substrate 12. Notably, the dots 40 do not cover the magnesium substrate 12 but are limited to being placed on only about one-third of the magnesium substrate 12. In still other aspects, the discontinuous region may cover from greater than or equal to 5% of the magnesium substrate 12 or from less than or equal to about 95% of the magnesium substrate 12, including all sub-ranges. More complex shapes than those depicted or combinations of various patterns or shapes may be used on a single magnesium substrate 12 within the scope of the present teachings.

As another alternate and as shown in FIG. 2C, the barrier layer 14 is continuous over the entire surface of the magnesium substrate 12 to be coated. In still other aspects a random placement of the barrier material is contemplated.

In various aspects, there is a transition 16 between the barrier layer 14 and the overlayer 18. The transition 16 can be an integral part of the barrier layer 14 and/or the overlayer 18. The transition 16 is a region where there is a gradient concentration of the barrier materials and overlayer materials. Particularly, the concentration of barrier materials is highest immediately adjacent the barrier layer 14 while the concentration of materials for the overlayer 18 is highest immediately adjacent the overlayer 18. The transition 16 allows integration of the overlayer materials into the barrier layer 14 to secure the overlayer materials onto the magnesium substrate 12. While it is depicted as a separate element, the transition 16 may be considered to be formed as a part of either the barrier layer 14 and/or the overlayer 18. The extent of the concentration gradient or the thickness of the transition 16 is modified in light of the thickness of each respective layer as is known in the art.

The overlayer 18 is tied to the magnesium substrate 12 via the barrier layer 14 and the transition 16. The overlayer 18 serves as a protective layer over the barrier layer 14 to protect both the barrier layer 14 and the magnesium substrate 12 from corrosion, corrosion-causing conditions, and cracks. The overlayer 18 has a thickness of from about a monolayer up to a thickness of equal to about 10 millimeters, including all sub-ranges. For example, the overlayer 18 has a thickness of from about greater than or equal to 100 micrometers to less than or equal to about 1 millimeter, including all sub-ranges. The overlayer 18 includes a corrosion resistant material that has been plastically deformed on at least a portion of the low melting point material due to the kinetic force of application from cold spraying, as will be detailed later herein.

As used herein, the term "corrosion resistant" refers to the ability of the material to resist deterioration caused by exposure to the environment. A corrosion resistant material is also able to resist salt spray or immersion testing. An exemplary salt spray testing is disclosed in ASTM B 117-07 titled "Standard Practice for Operating Salt Spray (Fog) Apparatus", as a non-limiting example which is incorporated herein by reference in its entirety.

Exemplary materials for the overlayer 18 include aluminum and alloys of aluminum, as non-limiting examples. In still other aspects, the materials for the overlayer 18 include zinc and alloys of zinc. Generally, the materials for the overlayer 18 have a melting point that is higher than a melting point of the barrier material. In other aspects, the overlayer materials have the same melting point as the barrier material.

Where an alloy of zinc or an alloy of aluminum is employed, the particular alloy may be selected to have a melting point that is less than the melting point of the respective magnesium or magnesium alloy upon which it is being coated. The materials to form the overlayer 18 are provided in particulate or powder form in various aspects, to facilitate application of the materials using cold spraying.

The present teachings provide methods of preparing coated magnesium 10. In various aspects, to prepare for the coating, the magnesium substrate is pre-cleaned prior to applying the barrier or protective materials. Such cleaning typically serves to remove any loosely adhered contaminants, such as oils, grease, waxy solids, particles (including metallic particles, carbon particles, dust, and dirt), silica, scale, and mixtures thereof. Many contaminants are added during the manufacturing of the metal material, and may also accumulate on the surface during transport or storage. Thus, pre-cleaning is useful in circumstances where the substrate is soiled with contaminants. In various aspects, pre-cleaning includes mechanical abrasion; cleaning with traditional alkaline cleaners, surfactants, or mild acid washes; or ultrasonic cleaning. The choice of the appropriate cleaning process or sequence of cleaning processes is selected based upon both the nature of the contaminant and the substrate. Metal oxides can be removed by plasma etching or by sputtering. Any method of removing oxides known to one of skill in the art that does not detrimentally impact the physical properties of the metal is within the scope of the present teachings.

First, a low melting point material is cold sprayed onto a region of the magnesium substrate 12. This spraying provides the barrier layer 14 as detailed above. The cold spraying is performed by placing a powder or particulate material of the low melting point material into the feed of a spray gun. In various aspects, a standard De Laval type of nozzle may be used. The spraying standoff distance is maintained at an adequate distance for the application, as is known in the art. For example, the standoff distance is from about 10 to about 50 millimeters in various aspects, including all sub-ranges. The spray gun is then engaged or activated to accelerate the particles at a sufficient speed to cause plastic deformation of the particles to form the barrier layer 14. A computer program or software may be used to accurately reproduce the coatings or to facilitate the application of patterns.

Notably, the barrier layer 14 is adhered to the magnesium substrate 12 using the kinetic force alone during this part of the process. The cold spraying is facilitated with an inert propellant to prevent oxidation of the magnesium substrate 12. Exemplary inert propellants include those known in the art, such as nitrogen or argon gas as non-limiting examples.

Because particles or powder are being applied using cold spraying, there are interstices or pores that form between some of the particles. For example, with application of the barrier layer 14 as depicted in FIG. 2C, while the barrier layer 14 is continuous across the magnesium substrate 12, there are some pores in the barrier layer 14. In various aspects of the present teachings, this porosity is separate from the discontinuous element.

To provide the barrier layer 14 as depicted in FIGS. 2A and 2B, the regions that are to not be covered by the low melting point material are masked to prevent application of the material to those areas. After spraying, the masking is removed to expose the underlying magnesium substrate 12 with the discrete regions of the low melting point material. In still other aspects, the discontinuous regions may be formed by selectively applying the spraying. For example, to achieve the pattern of FIG. 2A, a first stripe 30 is sprayed on the magnesium substrate 12. The flow of materials is then terminated until the spray gun is placed at a second position spaced apart from the first stripe (thus leaving a band 32) and then the spraying is resumed to create the second stripe. This is repeated to provide the desired pattern or random arrangement of the low melting point material.

Masking is also useful to incorporate or selectively place more than one low melting point material as the barrier layer 14. For example, a series of dots may be shaped by masking to apply a first low melting point material and a series of zig-zag random shapes may be subsequently masked over or adjacent the dots to apply a second low melting point material. It is understood that a plurality of regular, irregular, and/or random shapes and/or a plurality of different low melting point materials may be combined to form the barrier layer 14.

The thickness of the barrier layer 14 is controlled by modulating the amount of feed into the spraying device or by repeating the spraying until the desired thickness is achieved. In still other aspects, the thickness of the barrier layer 14 varies along the magnesium substrate 12 by "building up" a region with a greater spraying concentration.

Optionally, the magnesium substrate 12 and the barrier layer 14 are subjected to a heat treatment after application of the barrier layer 14 and prior to the application of the overlayer 18. In various aspects, the heat treatment includes heating the barrier layer 14 and magnesium substrate 12 in a furnace or via another method to heat the barrier layer 14 and the magnesium substrate 12 to a temperature of less than about 250 degrees Celsius, including all sub-ranges. This temperature is adequate to melt the low melting point material while not melting or even softening the magnesium substrate 12. In still other aspects, the temperature is adequate to prevent softening of the magnesium substrate 12.

After application of the barrier layer 14, the overlayer 18 is applied. The aluminum or zinc material is cold sprayed over at least a portion of the barrier layer 14 to form the coated magnesium substrate 10. A discontinuous pattern or random orientation of the overlayer 18 is achieved using the same masking or selective spraying techniques as detailed above for the barrier layer 14. The thickness of the overlayer 18 is controlled by modulating the amount of feed into the spraying device or by repeating the spraying. In still other aspects, the thickness of the overlayer 18 varies by "building up" a region with a greater spraying concentration next to a region that has a lesser concentration of the overlayer materials.

The transition 16 is partly formed when the aluminum or zinc material is cold sprayed over the barrier layer 14. The aluminum or zinc material for the overlayer 18 settles into the interstices that occur in the barrier layer 14 due to the low melting point material being applied in powder form and then plastically deforming against the magnesium substrate 12. In various aspects, the transition 16 is formed during the cold spray by using a metered mixture of barrier material and overlayer material. The relative metered amounts of barrier material and overlayer material are gradually changed during the cold spray application to form the transition 16.

The coated magnesium 10 is then heated to a temperature of less than or equal to 250 degrees Celsius to cause the cold sprayed low melting point material to melt and provide the interface to the magnesium substrate 12 to the aluminum or zinc material. This also facilitates formation of the transition 16. The heating also serves to soften or to melt the corrosion resistant aluminum or zinc material and provide the coated substrate. The heating can be to a temperature that is less than or equal to the lower of the low melting point material melting point or the overlayer material melting point. In various aspects, the heating will be to a temperature that is between the low melting point material melting point and the overlayer material melting point.

After the coated magnesium substrate 10 heated, it is cooled in a controlled process such as heat treatment aging or annealing. The controlled cooling process will further modify the microstructure of the coating. In other aspects, the coated magnesium substrate 10 is cooled by exposure to air, submersion in oil, or submersion in water. The exposure or submersion allow for a rapid cooling to harden the barrier layer 14 and the overlayer 18 to protect the magnesium substrate 12 from corrosion.

In yet other aspects, methods of preparing a coated magnesium substrate are provided. The barrier layer 14 is built using a plastically deformed barrier material on at least a region of the magnesium substrate 12. The overlayer 18 is built using a plastically deformed aluminum or zinc material over at least a region of the barrier layer 14 to form the coated magnesium substrate 10. The coated magnesium substrate 10 is heated to at least a melting temperature of at least one of the barrier material and the aluminum or zinc material.

Building the barrier layer 14 includes cold spraying the barrier material to the magnesium substrate 12. The barrier layer 14 is applied as a continuous layer over the magnesium substrate 12 as shown in FIG. 2C, or the barrier layer is applied as a discontinuous layer that does not cover an entire surface of the magnesium substrate 12 as shown in FIGS. 2A and 2B. Building the overlayer 18 includes cold spraying the overlayer material over one of the barrier layer 14 or directly over the magnesium substrate 12. An agglomeration of particles caused by repeated cold spraying causes the increased thickness of the layer.

In various aspects, the region between the barrier layer 14 and the overlayer 18 contains no transition 16. In other aspects, the transition 16 is provided between the barrier layer 14 and the overlayer 18. For example, if a single spraying gun or a single feed line is used, the aluminum or zinc material would be input into the spraying gun or single feed line without any cleaning to segregate the aluminum or zinc from the low melting point material. This causes there to be a switch in the concentration that is sprayed from the gun. To provide an abrupt interface that is free from a transition 16 or that has a minimal transition, a separate spraying gun and/or feed line are used or the devices are adequately cleaned between uses to prevent cross-contamination.

As detailed above, by heating the magnesium substrate 12 having the barrier layer 14 and the overlayer 18 thereon, a uniform coating is achieved. The heating is to a temperature that melts the barrier layer 14 and substrate 12 into each other and also softens the overlayer 18 and the barrier 14 such that they partially or fully melt into each other. This provides the synergistic benefits of adhesion for the coating that is much more durable as compared to traditional coating techniques alone.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

EXAMPLES

A magnesium substrate is cold sprayed with a low melting point material comprising tin powder. The metallurgic bonding layer with the magnesium substrate is formed at approximately 250 degrees Celsius, which is equivalent to an aging temperature. The magnesium substrate is then cold sprayed with an aluminum powder to provide a protective overlayer. Coating the magnesium substrate with the tin prior to application of the aluminum reduces the temperature required for metallurgic bonding of the aluminum to the substrate via the reduced melting point of the intermediate tin barrier layer. Conventional cold sprayed aluminum coating without the low melting temperature intermediate material forms a metallurgic bonding layer with the magnesium substrate at approximately 400 degrees Celsius.

The reduced application temperature for the aluminum, through incorporation of the intermediate tin barrier layer, prevents modification of the underlying magnesium substrate as magnesium is sensitive to heat and oxidation. Further the reduced application temperature prevents small cracks in diecast magnesium alloy substrate. The barrier layer is as an additional means by which to protect the underlying magnesium substrate by limiting the porosity of the overlayer. The overlayer or protective layer demonstrates better adherence, reduced porosity, and improved longevity and corrosion protection of the underlying substrate.

What is claimed is:

1. A method of coating a magnesium substrate comprising:
   cold spraying a low melting point material onto a region of the magnesium substrate;
   cold spraying a corrosion resistant material over at least a portion of the low melting point material to form a coated magnesium substrate; and
   heating the coated magnesium substrate.

2. The method of claim 1, wherein the corrosion resistant material comprises an aluminum or a zinc material.

3. The method of claim 1, wherein the low melting point material is selected from the group consisting of antimony, bismuth, cadmium, lead, tin, and alloys and combinations thereof.

4. The method of claim 1, wherein the low melting point material has a melting point of from greater than or equal to about 50 degrees Celsius to less than or equal to about 200 degrees Celsius.

5. The method of claim 1, further comprising heating the magnesium substrate having the low melting point material thereon prior to cold spraying the corrosion resistant material over the low melting point material.

6. The method of claim 1, wherein the low melting point material has a first melting point and the corrosion resistant material has a second melting point and further comprising heating the coated magnesium substrate to a temperature that is less than or equal to the lowest of the first melting point and the second melting point.

7. A method of preparing a coated magnesium substrate comprising:
   building a barrier layer by a process where a low melting point barrier material is plastically deformed on at least a region of a magnesium substrate;
   building an overlayer by a process where an aluminum or a zinc material is plastically deformed over at least a region of the barrier layer to form the coated magnesium substrate; and
   heating the coated magnesium substrate to at least a melting temperature of at least one of the low melting point barrier material and the aluminum or zinc material.

8. The method of claim 7, further comprising masking a portion of the magnesium substrate prior to building the barrier layer.

9. The method of claim 7, wherein the process of building the barrier layer comprises cold spraying the low melting point barrier material and wherein the process of building the overlayer comprises cold spraying the aluminum or zinc material.

10. The method of claim 7, further comprising creating a transition gradient between the barrier layer and the overlayer.

11. The method of claim 7, wherein the low melting point barrier material has a melting point of from greater than or equal to about 50 degrees Celsius to less than or equal to about 200 degrees Celsius.

12. The method of claim 7, further comprising heating the magnesium substrate having the barrier layer thereon prior to building the overlayer.

13. The method of claim 7, wherein building the barrier layer further comprises applying the low melting point barrier material at a thickness of from a monolayer to about 1 millimeter.

14. The method of claim 7, wherein building the overlayer further comprises applying the aluminum or zinc material at a thickness of from a monolayer to about 10 millimeters.

15. The method of claim 7, further comprising applying the barrier layer to discontinuously cover the magnesium substrate.

16. The method of claim 15, wherein the heating forms a uniform coating on the magnesium substrate.

17. A method of coating a magnesium substrate comprising:
   cold spraying a material comprising a metal selected from the group consisting of antimony, bismuth, cadmium, lead, tin, and alloys and combinations thereof onto a region of the magnesium substrate;
   cold spraying a corrosion resistant material comprising a metal selected from the group consisting of aluminum, zinc, and combinations thereof over at least a portion of the material to form a coated magnesium substrate; and
   heating the coated magnesium substrate.

* * * * *